United States Patent
Lee et al.

(10) Patent No.: US 10,299,157 B2
(45) Date of Patent: May 21, 2019

(54) APPARATUS AND METHOD FOR MANAGING CONGESTION IN WIRELESS COMMUNICATION SYSTEM

(71) Applicant: Samsung Electronics Co., Ltd., Suwon-si, Gyeonggi-do (KR)

(72) Inventors: Jin-Sung Lee, Seoul (KR); Han-Na Lim, Seongnam-si (KR); Jung-Shin Park, Seoul (KR); Joo-Hyung Lee, Gwacheon-si (KR); Ji-Cheol Lee, Suwon-si (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/363,539

(22) Filed: Nov. 29, 2016

(65) Prior Publication Data

US 2017/0156078 A1 Jun. 1, 2017

(30) Foreign Application Priority Data

Nov. 30, 2015 (KR) ........................ 10-2015-0169302

(51) Int. Cl.
*H04L 12/28* (2006.01)
*H04W 28/02* (2009.01)
(Continued)

(52) U.S. Cl.
CPC ......... *H04W 28/0236* (2013.01); *H04L 45/02* (2013.01); *H04L 45/124* (2013.01);
(Continued)

(58) Field of Classification Search
USPC ....... 370/334, 351, 498, 225, 230, 238, 252, 370/255, 328, 332, 352, 389, 395.1, 370/395.21, 400
See application file for complete search history.

(56) References Cited

U.S. PATENT DOCUMENTS

2004/0180677 A1 9/2004 Harris et al.
2008/0298251 A1* 12/2008 Khuu .................... H04L 45/125
370/238

(Continued)

FOREIGN PATENT DOCUMENTS

EP 2 424 327 A1 2/2012
EP 2 683 183 A1 1/2014
(Continued)

OTHER PUBLICATIONS

Wischik et al., Design, Implementation and Evaluation of Congestion Control for Multipath TCP, Mar. 30, 2011, pp. 1-14, University College London.

(Continued)

*Primary Examiner* — Phuongchau Ba Nguyen
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for managing congestion in a first node in a wireless communication system is provided. The method includes receiving status information from each of nodes configuring a network with the first node, receiving information about a service requirement criterion from a second node as one of the nodes, acquiring additional path setup information for the second node based on the status information received from each of the nodes and the information about the service requirement criterion received from the second node, and transmitting the acquired additional path setup information to the second node.

10 Claims, 13 Drawing Sheets

(51) Int. Cl.
   *H04L 12/751* (2013.01)
   *H04L 12/803* (2013.01)
   *H04L 12/801* (2013.01)
   *H04L 12/729* (2013.01)
   *H04W 40/12* (2009.01)
   *H04W 40/24* (2009.01)
   *H04L 12/721* (2013.01)

(52) U.S. Cl.
   CPC .......... *H04L 45/125* (2013.01); *H04L 47/122* (2013.01); *H04L 47/18* (2013.01); *H04W 28/0268* (2013.01); *H04W 40/12* (2013.01); *H04W 40/246* (2013.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/21* (2018.01); *Y02D 70/26* (2018.01); *Y02D 70/34* (2018.01)

(56) References Cited

U.S. PATENT DOCUMENTS

| | | | |
|---|---|---|---|
| 2010/0208741 A1* | 8/2010 | Vasseur | .................. H04L 45/02 370/400 |
| 2013/0077501 A1 | 3/2013 | Krishnaswamy et al. | |
| 2014/0357258 A1 | 12/2014 | Smith et al. | |
| 2015/0281367 A1 | 10/2015 | Nygren et al. | |

FOREIGN PATENT DOCUMENTS

| | | |
|---|---|---|
| EP | 2 720 507 A1 | 4/2014 |
| KR | 10-2012-0071952 A | 7/2012 |
| KR | 10-2013-0142426 A | 12/2013 |
| KR | 10-2014-0089251 A | 7/2014 |
| WO | 2014/000128 A1 | 1/2014 |
| WO | 2014/019528 A1 | 2/2014 |
| WO | 2015/030641 A1 | 3/2015 |
| WO | 2015/094043 A1 | 6/2015 |

OTHER PUBLICATIONS

Raiciu et al., Coupled Congestion Control for Multipath Transport Protocols, Internet Engineering Task Force (IETF), Request for Comments: 6356, Oct. 2011, ISSN: 2070-1721, University College London.

European Search Report dated Sep. 12, 2018, issued in European Application No. 16871010.1.

* cited by examiner

APPARATUS AND METHOD FOR MANAGING CONGESTION IN WIRELESS COMMUNICATION SYSTEM

CROSS-REFERENCE TO RELATED APPLICATION(S)

This application claims the benefit under 35 U.S.C. § 119(a) of a Korean patent application filed on Nov. 30, 2015 in the Korean Intellectual Property Office and assigned Serial number 10-2015-0169302, the entire disclosure of which is hereby incorporated by reference.

TECHNICAL FIELD

The present disclosure relates to an apparatus and method for managing congestion in a wireless communication system. More particularly, the present disclosure to an apparatus and method for managing congestion in a wireless communication system transmitting data based on a multi-path.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), a reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Enhancement of camera performance and implementation of a personal broadcast service application facilitate live broadcast with a high-definition image of definition equal to or greater than 2 k ultra high definition (UHD) on a client terminal such as a smart phone, and/or the like.

For transmitting a high-definition image in real time in a client terminal, a sufficient data rate, e.g., a data rate equal to or greater than 6 Mbps needs to be guaranteed in an uplink channel. However, a bandwidth of a wireless channel which is based on a cellular network (hereinafter, it will be referred to as "cellular channel") is narrow. Thus, when the number of client terminals in a serving evolved node B (eNB) increases, the data rate per client terminal decreases thereby making it difficult to guarantee a high data rate.

Meanwhile, a wireless communication system has proposed various technologies for increasing transmission capability, and a typical one is a carrier aggregation (CA) technology. The CA technology has been implemented with various forms, and an inter-heterogeneous eNB CA technology as one of the various forms is a technology in which frequency resources of different communication networks may be aggregated. For example, the inter-heterogeneous eNB CA technology may aggregate frequency resources of an LTE mobile communication system. Further, the inter-heterogeneous eNB CA technology may aggregate a frequency resource of an LTE mobile communication system and a frequency resource of a third generation (3G) mobile communication system, or a frequency resource of an LTE mobile communication system and a frequency resource of a wireless local area network (WLAN), e.g., a Wi-Fi, and/or the like. So, the inter-heterogeneous eNB CA technology may effectively use resources in various communication schemes for increasing a data rate.

Another one of the various technologies for increasing the transmission capability proposed in the wireless communication system is a multi-path transmission control protocol (MPTCP). The MPTCP is an example of a new transmission layer protocol which is generated for increasing a data rate using a multi-path. The MPTCP may combine a plurality of transmission paths connecting hosts, e.g., subflows to form one multi-path, e.g., an MPTCP flow and exchange data through the plurality of transmission paths. So, if the MPTCP is used, a preset number of transmission paths may be generated between the hosts.

For example, if the MPTCP is used, a data rate sufficient for providing a live video with high definition in real time may be acquired by combining insufficient cellular channel resources, e.g., uplink cellular channel resources. Further, hosts which transmit and receive data based on the MPTCP may distribute traffic to other transmission paths if a congestion situation occurs on a specific transmission path or a connection thereof is released due to various reasons.

In a general communication system supporting a multi-path, there is a need for a congestion control scheme for maximizing a data rate between hosts. However, in a current MPTCP standard, a congestion control scheme for an MPTCP is not defined, so a congestion control scheme for a transmission control protocol (TCP) is used. Due to this, congestion control in which a characteristic of an MPTCP is reflected is not performed, so various issues such as fairness violation due to duplicative occupation of a bottleneck in a multi-path, packet reordering due to difference among data rates and difference among round trip time (RTT) of transmission paths, and/or the like may occur.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for managing congestion in a wireless communication system.

Another aspect of the present disclosure is to provide an apparatus and method for managing congestion for a multi-path in a wireless communication system transmitting data through the multi-path.

Another aspect of the present disclosure is to provide an apparatus and method for allocating a data rate for each of transmission paths included in a multi-path in a wireless communication system transmitting data through the multi-path.

Another aspect of the present disclosure is to provide an apparatus and method for determining throughput for each of a plurality of transmission control protocol (TCP) connections included in a multi-path in a client terminal in a case that an multi-path transmission control protocol (MPTCP) is used in the multi-path including a wireless link in a wireless communication system transmitting data through the multi-path.

Another aspect of the present disclosure is to provide an apparatus and method for performing congestion control for a multi-path by considering a situation of another client terminal in a client terminal supporting an MPTCP based on the multi-path including at least one transmission path via the another client terminal.

Another aspect of the present disclosure is to provide an apparatus and method for performing congestion control for a multi-path by considering energy efficiency of another client terminal in a client terminal supporting an MPTCP based on the multi-path including at least one transmission path via the another client terminal.

Another aspect of the present disclosure is to provide an apparatus and method for performing congestion control for a multi-path thereby maximizing life time during which data transmission/reception through the multi-path is possible in a client terminal supporting an MPTCP based on the multi-path including at least one transmission path via another client terminal.

Another aspect of the present disclosure is to provide an apparatus and method for transmitting and receiving data through at least one transmission path via another terminal by considering a congestion situation of a transmission path supporting a direct communication included in a multi-path in a client terminal supporting an MPTCP based on the multi-path including at least one transmission path via the another client terminal.

Another aspect of the present disclosure is to provide an apparatus and method for controlling congestion in a client terminal thereby maximizing life time during which data is transmitted/received based on a multi-path by considering battery status and radio link characteristics of a plurality of client terminals joining the multi-path.

Another aspect of the present disclosure is to provide an apparatus and method for setting up a multi-path suitable for a master node or a specific slave node based on information collected from at least one slave node within a small network in the master node.

In accordance with an aspect of the present disclosure, a method for managing congestion in a first node in a wireless communication system is provided. The method includes receiving status information from each of nodes configuring a network with the first node, receiving information about a service requirement criterion from a second node as one of the nodes, acquiring additional path setup information for the second node based on the status information received from each of the nodes and the information about the service requirement criterion received from the second node, and transmitting the acquired additional path setup information to the second node.

In accordance with another aspect of the present disclosure, a first node in a wireless communication system is provided. The first node includes a transceiver configured to receive status information from each of nodes configuring a network with the first node, receive information about a service requirement criterion from a second node as one of the nodes, and transmit additional path setup information to the second node, and at least one processor configured to acquire the additional path setup information for the second node based on the status information of each of the nodes and the information about the service requirement criterion received through the transceiver, and to transfer the acquired additional path setup information to the transceiver.

In accordance with another aspect of the present disclosure, a method for managing congestion in a second node in a wireless communication system is provided. The method includes transmitting data to a fourth node through an initial path, receiving status information from a third node which sets up a direct path with the second node based on additional path setup information received from a first node which configures a network with the second node, determining whether to use an additional path connecting to the fourth node via the third node by considering traffic amount according to data transmission to the fourth node, determining a window size for setting a data rate on the additional path based on the received status information upon determining to use the additional path, and transmitting data to the third node through the direct path based on the determined window size.

In accordance with another aspect of the present disclosure, a second node in a wireless communication system is provided. The second node includes a transceiver configured to receive status information from a third node which sets up a direct path with the second node based on additional path setup information received from a first node which configures a network with the second node; and at least one processor configured to determine whether to use an additional path connecting to the fourth node via the third node by considering traffic amount according to data transmission to the fourth node, determine a window size for setting a data rate on the additional path based on the received status information when determining to use the additional path, and manage data transmission by the transceiver to the third node through the direct path based on the determined window size.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
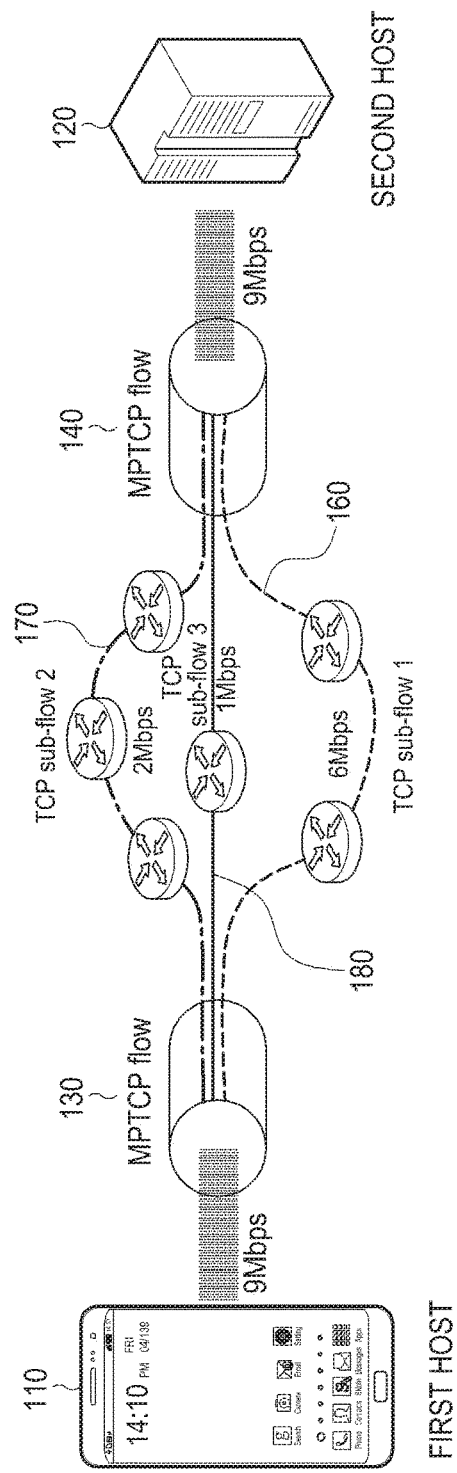
FIG. 1 schematically illustrates an example of a case where a multi-path transmission control protocol (MPTCP) is applied in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS)

receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

In various embodiments of the present disclosure, the term node may be used as the term meaning all devices which may access a network. The node may be classified into a transmitting node, a relay node (RN), and a receiving node, or a master node and a slave node according to a role. The node may be a point which connects wire paths or wireless paths each other. Here, a path may be a communication path, a data circuit, and/or the like. The term node may be interchangeable with the term host.

For example, a master node configures a small network, and at least one slave node located at the small network sets up a multi-path thereby performing congestion control for transmitting/receiving data through the set up multi-path.

In various embodiments of the present disclosure, a client may be a subject using a service, and a server may be a subject providing a service. For example, in a case that data is transmitted through a uplink configured with a multi-path, the client may mean a transmitting node, a transmitting host, and/or the like, and the server may mean a receiving node, a receiving host, and/or the like.

For example, a device which may support a wireless communication service such as a node, a host, a client terminal, and/or the like may include at least one of a smart phone, a tablet PC, a mobile phone, a video phone, an e-book reader, a desktop PC, a laptop PC, a netbook computer, a workstation server, a PDA, a PMP, an mp3 player, a mobile medical device, a camera, a wearable device (e.g., smart glasses, an HMD, electronic clothes, electronic braces, an electronic necklace, an electronic appcessory, an electronic tattoo, or a smart watch), and/or the like.

In various embodiments of the present disclosure, a device may be a smart home appliance. Here, the smart home appliance may include at least one of, for example, a television, a DVD player, an audio, a refrigerator, an air conditioner, a vacuum cleaner, an oven, a microwave oven, a washer, a set-top box, a home automation control panel, a security control panel, a TV box (e.g., Samsung HomeSync™, Apple TV™, or Google TV™), a gaming console (e.g., Xbox™ or PlayStation™), an electronic dictionary, an electronic key, a camcorder, an electronic picture frame, and/or the like.

In various embodiments of the present disclosure, a device which may support a wireless communication service may include at least one of portable medical devices (e.g., a blood glucose monitoring device, a heart rate monitor, a hemadynamometer, a thermometer, and/or the like), an MRA device, an MRI device, a CT device, an imaging device, an ultrasonic device, a navigation device, a GPS receiver, an EDR, an FDR, an automotive infotainment device, a naval electronic device (e.g., naval navigation device, a gyroscope compass, and/or the like), an avionic electronic device, a security device, a vehicular head unit, an industrial or consumer robot, an automatic teller's machine (ATM) of financial institutes, a point of sales (POS) of a store, internet of things (IoT) (e.g., a bulb, various sensors, an electricity or gas meter, a sprinkler, a fire alarm, a thermostat, a streetlamp, a toaster, sporting goods, a hot water tank, a heater, a boiler, and/or the like), and/or the like.

In various embodiments of the present disclosure, a device which may support a wireless communication service may include at least one of furniture, part of a building/structure, an electronic board, electronic signature receiving device, a projector, various measuring devices (e.g., water, electricity, gas or electro-magnetic wave measuring devices), and/or the like.

In various embodiments of the present disclosure, a device which may support a wireless communication service may be any combination of the foregoing devices or a flexible electronic device.

According to various embodiments of the present disclosure, for example, a transmitting apparatus or a receiving apparatus may be a client terminal.

According to various embodiments of the present disclosure, for example, a transmitting apparatus or a receiving apparatus may be an evolved node B (eNB).

In various embodiments of the present disclosure, it will be noted that the term transmitting apparatus may be interchangeable with the term transmitting node and/or the like, and the term receiving apparatus may be interchangeable with the term receiving node and/or the like.

In various embodiments of the present disclosure, it will be noted that the term client terminal may be interchangeable with the term user equipment (UE), wireless communication terminal, mobile station (MS), wireless terminal, mobile device, and/or the like.

In various embodiments of the present disclosure, it will be noted that the term eNB may be interchangeable with the term access point (AP), base station (BS), and/or the like.

An embodiment of the present disclosure may provide an apparatus and method for managing congestion in a wireless communication system.

An embodiment of the present disclosure may provide an apparatus and method for managing congestion for a multi-path in a wireless communication system transmitting data through the multi-path.

An embodiment of the present disclosure may provide an apparatus and method for allocating a data rate for each of transmission paths included in a multi-path in a wireless communication system transmitting data through the multi-path.

An embodiment of the present disclosure may provide an apparatus and method for determining throughput for each of a plurality of transmission control protocol (TCP) connections included in a multi-path in a client terminal in a case that a multi-path transmission control protocol (MPTCP) is used in the multi-path including a wireless link in a wireless communication system transmitting data through the multi-path.

An embodiment of the present disclosure may provide an apparatus and method for performing congestion control for a multi-path by considering a situation of another client terminal in a client terminal supporting an MPTCP based on the multi-path including at least one transmission path via the another client terminal.

An embodiment of the present disclosure may provide an apparatus and method for performing congestion control for a multi-path by considering energy efficiency of another client terminal in a client terminal supporting an MPTCP based on the multi-path including at least one transmission path via the another client terminal.

An embodiment of the present disclosure may provide an apparatus and method for performing congestion control for a multi-path thereby maximizing life time during which data transmission/reception through the multi-path is possible in a client terminal supporting an MPTCP based on the multi-path including at least one transmission path via another client terminal.

An embodiment of the present disclosure may provide an apparatus and method for transmitting and receiving data through at least one transmission path via another terminal by considering a congestion situation of a transmission path supporting a direct communication included in a multi-path in a client terminal supporting an MPTCP based on the multi-path including at least one transmission path via the another client terminal.

An embodiment of the present disclosure may provide an apparatus and method for controlling congestion in a client terminal thereby maximizing life time during which data is transmitted/received based on a multi-path by considering battery status and radio link characteristics of a plurality of client terminals joining the multi-path.

An embodiment of the present disclosure may provide an apparatus and method for setting up a multi-path suitable for a master node or a specific slave node based on information collected from at least one slave node within a small network in the master node.

Various embodiments of the present disclosure may provide a scheme of setting up a multi-path connecting a transmitting node and a receiving node and performing congestion control according to data transmission/reception through the setup multi-path. The multi-path may include a path via an RN. The multi-path may share a wireless channel which will be a bottleneck.

An embodiment of the present disclosure may provide a scheme of setting up a suitable multi-path based on information collected by a transmitting node from at least one neighbor node and performing congestion control for the setup multi-path.

An embodiment of the present disclosure may provide a scheme in which a transmitting node sets up a multi-path with assistance of a master node and performs congestion control for the setup multi-path. In this case, the master node may control the transmitting node to setup a multi-path based on information collected from at least one client terminal located within a small network in order to help the transmitting node to set up the multi-path.

For example, an embodiment of the present disclosure will provide a scheme in which a master node included in a small network collects information from one or more client terminals located within the small network, and sets up a multi-path suitable for a service requirement criterion, e.g., a quality of service (QoS) based on the collected information.

Various embodiments of the present disclosure will provide a scheme in which a transmitting node maximizes lifetime during which data transmission/reception may be maintained and controls a congestion situation by considering energy efficiency.

An embodiment of the present disclosure proposes a scheme of generating a new transmission path and determining data rate for the new transmission path when a transmitting node and a receiving node transmit and receive data based on an MPTCP. At this time, in the new transmission path, at least one hop may be added compared to an existing transmission path for using an RN. For example, the connection between the transmitting node and the RN according to the generation of the new transmission path may be an end-to-end (E2E) connection which is based on a near field communication technology Wi-Fi direct, Bluetooth, and/or the like.

The transmitting node may determine the data rate for the new transmission path thereby maximizing life time during which data may be transmitted/received on the multi-path.

For example, the life time during which the data may be transmitted/received on the multi-path may be determined by maximizing life time of each of a transmitting node and at least one RN which join data transmission/reception through the multi-path. For this, the transmitting node may collect predetermined information from the at least one RN for detecting a situation of the at least one RN. For example, the transmitting node may collect node status information from the at least one RN. The node status information may include wireless channel status information from which battery remaining energy and an available data rate of an RN may be acquired. The battery remaining energy and the available data rate of the RN may be used for predicting life time.

For example, a data rate for the new transmission path may be allocated by setting a window size to be used for transmitting data. Generally, a TCP defines three types of window sizes. That is, a TCP defines a transmission window (twnd) size, i.e., an effective window (effective wnd) size, a reception window (rwnd) size, and a congestion window (cwnd) size. The twnd size defines the number of segments which may be transmitted, the rwnd size defines available capacity of a reception buffer, and the cwnd size defines a window size used in a connection initial situation and a congestion situation. Generally, the twnd size may be determined based on a window size as the smaller one of the rwnd size and the cwnd size.

In various embodiments of the present disclosure, the term effective wnd size may be interchangeable with the term cwnd size, and two types of window sizes, i.e., the effective wnd size and the cwnd size may be used for determining a data rate. It will be assumed that the two types of window sizes may be predicted each other. That is, in various embodiments of the present disclosure, the twnd size may be predicted from the cwnd size, and the cwnd size may be predicted from the twnd size.

According to an embodiment of the present disclosure, a twnd size may be set to the smaller one of a window size which is calculated based on at least one of queue status of a transmission buffer in a transmitting node, round trip time (RTT) of an existing path, and RTT of a newly setup path, and a window size of the existing path. For convenience, the term existing path may be interchangeable with the term initial path, first path, and subflow 1, and the term the newly setup path may be interchangeable with the term additional path, second path, and subflow 2. For convenience, a window size allocated for the first path will be referred to as "first window size", and a window size allocated for the second path will be referred to as "second window size". At this time, the term first window size may be used as meaning of the term first twnd size or the term first cwnd size, and the term second window size may be used as meaning of the term second twnd size or the term second cwnd size.

If a window size of an existing path, e.g., the first path is greater than a specific threshold value before a newly setup path, e.g., an additional path or the second path is used, the window size of the existing path may be adjusted to the specific threshold value when a window size of the newly setup path is set.

According to an embodiment of the present disclosure, a transmitting node may determine whether to use a newly setup path for an MPTCP by considering queue status of a transmission buffer storing data to be transmitted. That is, the transmitting node compares amount of data stored in the transmission buffer and a preset threshold value to transmit a part of the data stored in the transmission buffer through the newly setup path based on the compared result.

If the amount of data stored in the transmission buffer is greater than the preset threshold value, the transmitting node may transmit data of which amount corresponds to difference between the amount of the data stored in the transmission buffer and the preset threshold value through the newly setup path. If the amount of the data stored in the transmission buffer is not greater than the preset threshold value, the transmitting node does not need to transmit data through the newly setup path. The threshold value may be preset based on a data rate which is allocated corresponding to each path included in the multi-path and RTT thereby maximizing life time during which data may be transmitted/received through the multi-path.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

An example of a case that an MPTCP is applied in a wireless communication system to which various embodiments of the present disclosure may be applied will be described with reference to FIG. 1.

FIG. 1 schematically illustrates an example of a case that an MPTCP is applied in a wireless communication system according to an embodiment of the present disclosure.

Referring to FIG. 1, a first host 110 may be connected to a second host 120 through a multi-path. For example, the first host 110 may be a client terminal, and the second host 120 may be a server. For this, the first host 110 needs to perform an operation of setting up a multi-path connecting the first host 110 and the second host 120 and an operation of controlling congestion for the set up multi-path.

The multi-path connecting the first host 110 and the second host 120 may include three transmission paths, e.g., a TCP subflow 1 160, a TCP subflow 2 170, and a TCP subflow 3 180. The three paths, i.e., the TCP subflow 1 160, the TCP subflow 2 170, and the TCP subflow 3 180 may be included in one multi-path, e.g., MPTCP flows 130 and 140.

For providing effective data transmission based on an MPTCP, there is a need for controlling congestion for TCP subflows included in one MPTCP flow. For example, the congestion control means that total traffic amount to be processed through one MPTCP flow is distributed to TCP subflows.

For example, in a case that a data rate of 9 Mbps is supported through one MPTCP flow, i.e., MPTCP flows 130 and 140, based on congestion control, data rates for the TCP subflow 1 160, the TCP subflow 2 170, and the TCP subflow 3 180 may be allocated as 6 Mbps, 2 Mbps, and 1 Mbps, respectively.

An example of a case that an MPTCP is applied in a wireless communication system to which various embodiments of the present disclosure may be applied has been described with reference to FIG. 1, and a stack structure supporting an MPTCP according to various embodiments of the present disclosure will be described with reference to FIG. 2.

Figure 2:
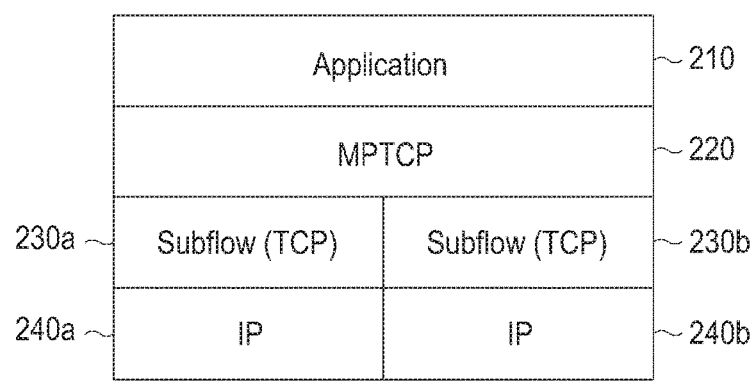
FIG. 2 schematically illustrates a stack structure supporting an MPTCP according to an embodiment of the present disclosure.

FIG. 2 schematically illustrates a stack structure supporting an MPTCP according to an embodiment of the present disclosure.

Referring to FIG. 2, an MPTCP stack may have a structure in which an MPTCP layer 220 is added to a general TCP stack structure. The MPTCP layer 220 is located among an application layer 210 and a plurality of TCP layers 230a and 230b. The number of TCP layers as a lower layer of the MPTCP layer 220 may be determined based on the number of transmission paths included in a multi-path, i.e., subflows. Lower layers corresponding to the plurality of TCP layers 230a and 230b may be configured by IP layers 240a and 240b.

A stack structure supporting an MPTCP according to various embodiments of the present disclosure has been described with reference to FIG. 2, and an example of a procedure performed in a wireless communication system according to various embodiments of the present disclosure will be described with reference to FIG. 3.

Figure 3:
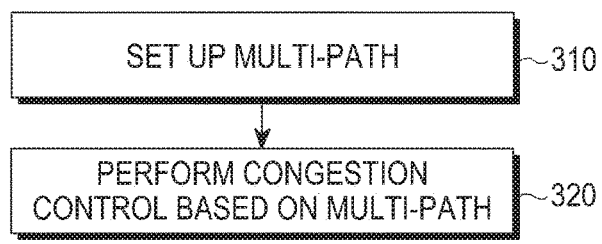
FIG. 3 schematically illustrates an example of a procedure performed in a wireless communication system according to an embodiment of the present disclosure.

FIG. 3 schematically illustrates an example of a procedure performed in a wireless communication system according to an embodiment of the present disclosure.

Referring to FIG. 3, a transmitting node may set up a multi-path with a receiving node at operation 310. For example, the multi-path may be based on an MPTCP. The multi-path may include at least an initial transmission path in which the transmitting node is directly connected to a network using a wireless resource and an additional transmission path in which the transmitting node is connected to the network using an RN. The transmitting node may form a connection for a direct communication with the RN.

The transmitting node may set up a multi-path based on information collected by the transmitting node from neighbor nodes or additional path setup information provided from a master node of a small network which the transmitting node joins.

According to an embodiment of the present disclosure, a transmitting node may set up a direct path with a selected RN using information collected from neighbor nodes or additional path setup information provided from a master node. The transmitting node may form an additional transmission path by setting up a direct path with the RN.

The transmitting node may perform congestion control for determining a data rate of each of transmission paths included in a multi-path thereby maximizing life time according to data transmission/reception through the multi-path at operation 320.

According to an embodiment of the present disclosure, the transmitting node may determine the first twnd for setting a data rate on an additional transmission path and the second twnd of setting a data rate on an existing transmission path based on status information received from an RN with which a direct path is set up.

An example of a procedure performed in a wireless communication system according to various embodiments of the present disclosure has been described with reference to FIG. 3, and an example of a scenario in which a transmitting node transmits data based on a multi-path in a wireless communication system according to various embodiments of the present disclosure will be described with reference to FIG. 4.

Figure 4:
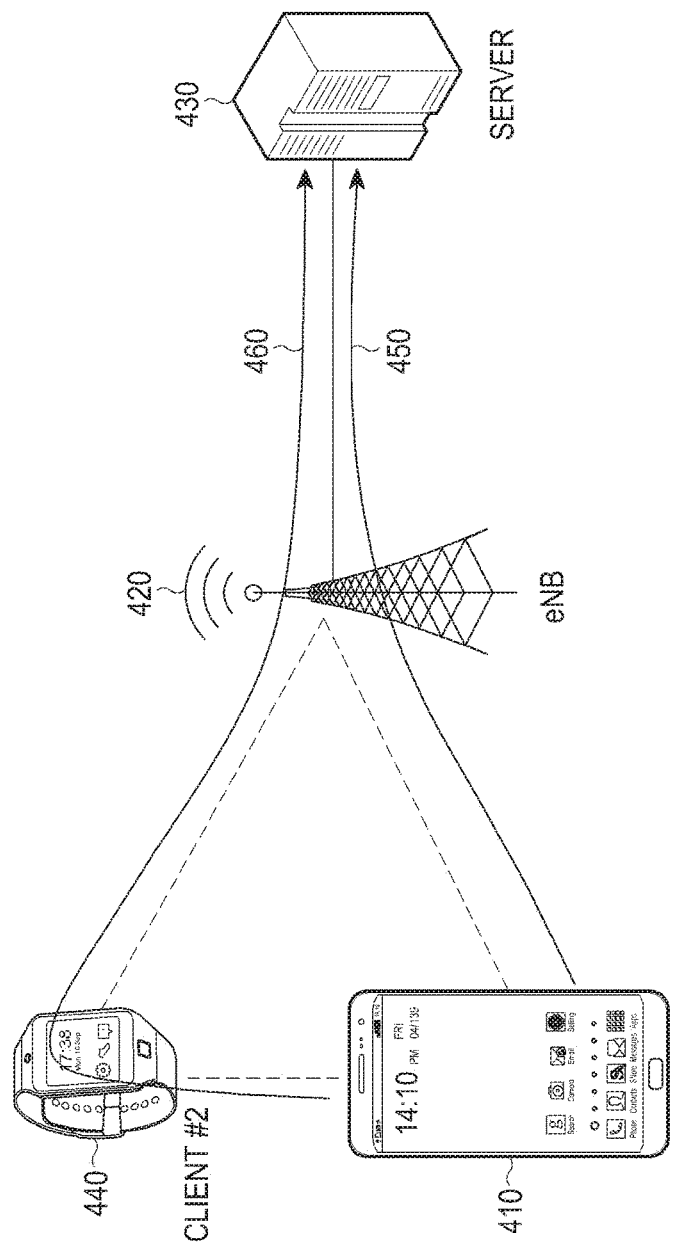
FIG. 4 schematically illustrates an example of a scenario in which a transmitting node transmits data based on a multi-path in a wireless communication system according to an embodiment of the present disclosure.

FIG. 4 schematically illustrates an example of a scenario in which a transmitting node transmits data based on a multi-path in a wireless communication system according to an embodiment of the present disclosure.

Referring to FIG. 4, a transmitting node 410 may transmit data (hereinafter, "uplink data") to a receiving node 430 through two uplinks, e.g., a first uplink 450, e.g., an MPTCP subflow 1 and a second uplink 460, e.g., an MPTCP subflow 2.

In the first uplink 450, the transmitting node 410 may be connected to the receiving node 430 through a cellular network. In the second uplink 460, the transmitting node 410 may be connected to the receiving node 430 via a direct path connected to an RN 440. In the second uplink 460, the transmitting node 410 may be connected to the RN 440 through a local area network such as a wireless local area network (WLAN) and/or the like, and the RN 440 may be connected to the receiving node 430 through a cellular network. Hereinafter, a link connecting the transmitting node 410 to the RN 440 based on a local area network such as a WLAN and/or the like will be referred to as "local area link", and a link connecting the transmitting node 410 or the RN 440 to the receiving node 430 based on a cellular network will be referred to as "cellular link".

For example, the transmitting node 410 performs tethering to connect a local area link with the RN 440. The cellular link may include a wireless link and a wire link. The wireless link may be a link, e.g., a wireless channel connecting the transmitting node 410 or the RN 440 to an eNB 420 configuring a cellular network, and the wire link may be a link, e.g., a wire channel connecting the eNB 420 to the receiving node 430.

As described above, upon transmitting uplink data based on the MPTCP, the transmitting node 410 may distribute the uplink data over the first and second uplink 450 and 460 and transmit the uplink data via the first and second uplink 450 and 460. In this case, congestion control for an uplink may be relatively easy and data transmission may be maintained using remaining uplinks if it is not possible to use one of a plurality of uplinks due to various reasons.

According to an embodiment of the present disclosure, the transmitting node 410 collects status information from neighbor nodes to acquire additional path setup information based on the collected status information and information related to a service requirement of the transmitting node 410. The transmitting node 410 may set up a direct path with the RN 440 using the acquired additional path setup information. So, the transmitting node 410 may form a multi-path by the first uplink 450 as an existing path connecting to the receiving node 430 and an additional path connecting to the receiving node 430 via the RN 440.

An example of a scenario in which a transmitting node transmits data based on a multi-path in a wireless communication system according to various embodiments of the present disclosure has been described with reference to FIG. 4, and an example of a procedure in which a transmitting node transmits data based on a multi-path in a wireless communication system according to various embodiments of the present disclosure will be described with reference to FIG. 5.

Figure 5:
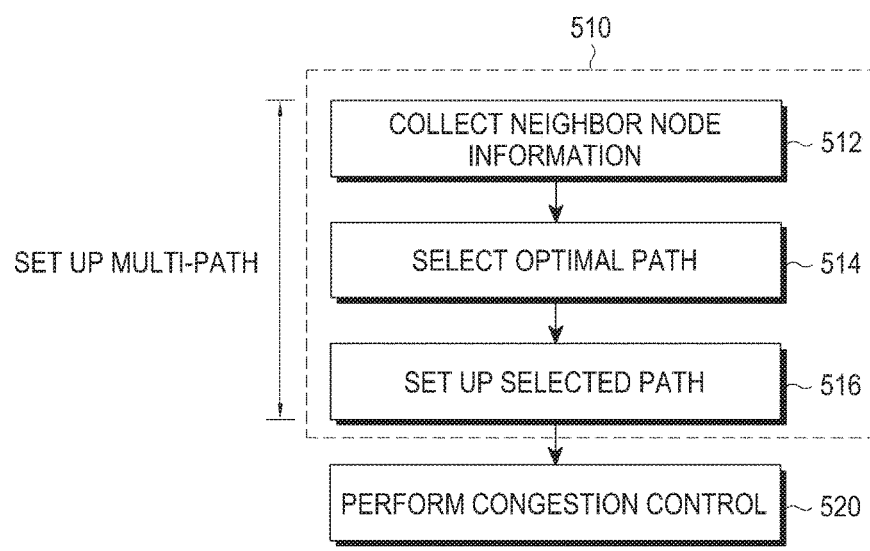
FIG. 5 schematically illustrates an example of a procedure in which a transmitting node transmits data based on a multi-path in a wireless communication system according to an embodiment of the present disclosure.

FIG. 5 schematically illustrates an example of a procedure in which a transmitting node transmits data based on a multi-path in a wireless communication system according to an embodiment of the present disclosure.

Referring to FIG. 5, a transmitting node may set up a multi-path at operation 510. For example, the transmitting node may collect status information from neighbor nodes with which the transmitting node may set up a direct path at operation 512. The status information may include information about a wireless link characteristic and an E2E path characteristic and computing resource information of a neighbor node. The information about the wireless link characteristic may include at least one of reference signal received power (RSRP), a reference signal received quality (RSRQ), a signal to interference-plus-noise ratio (SINR), a modulation and coding scheme (MCS) level, a service coverage, and a bit error rate (BER). The information about the E2E path characteristic may include at least one of TCP throughput, RTT, and a packet error rate.

The transmitting node may select an optimal path to be set up as an additional path based on the status information collected from the neighbor nodes and information about a service requirement criterion corresponding to a service to be initiated at operation 514. The selection of the optimal path may mean designation of an RN with which the transmitting node sets up a direct path for setting up an additional path. For example, the information about the service requirement criterion may include information about at least one of a minimum throughput (Min throughput), a maximum RTT (Max RTT), a maximum error tolerance rate, and a minimum calculating capability which are required for the service to be initiated.

According to an embodiment of the present disclosure, the transmitting node configures an E2E path information table using the status information collected from the neighbor nodes, and acquires additional path setup information satisfying the service requirement criterion corresponding to the service to be initiated from the configured E2E path information table to select an optimal path using the acquired additional path setup information.

The transmitting node may set up the path selected as the optimal path at operation 516. For example, the transmitting node may set up the selected path by setting up a direct path with a designated RN.

The transmitting node may perform congestion control for the set up multi-path at operation 520. The congestion control may mean that traffic distribution is performed for transmitting a part of data transmitted through an existing path through a new additional path.

According to an embodiment of the present disclosure, the transmitting node may receive status information from an RN to which a direct path is connected. The status information received from the RN may include information about battery remaining energy of the RN. The status information may include wireless channel status information. The wireless channel status information may be information to be considered for acquiring an available data rate.

The transmitting node may determine whether to use an additional path by considering traffic amount to be transmitted to a receiving node. The additional path is a transmission path connecting the receiving node via an RN to which a direct path is connected. For example, the transmitting node may determine whether to use the additional path by setting a threshold value by considering maximum life time predicted by battery remaining energy of the transmitting node and battery remaining energy of the RN, and determining whether the traffic amount to be transmitted to the receiving node is greater than the set threshold value.

Upon determining to use the additional path, the transmitting node may determine a twnd size for setting a data rate on the additional path based on the status information received from the RN. For example, the transmitting node calculates the first twnd size based on a data rate which is estimated corresponding to each of an initial path and an additional path and amount of traffic according to data transmission to the receiving node, calculates the second twnd size based on RTT corresponding to each of the initial path and the additional path, the traffic amount according to the data transmission to the receiving node, and the set threshold value, and determine the smaller one of the first twnd size and the second twnd size as the twnd size.

The transmitting node may transmit data to the RN through the direct path using the determined twnd size.

Although FIG. 5 illustrates an example of a procedure in which a transmitting node transmits data based on a multi-path in a wireless communication system according to an embodiment of the present disclosure, various changes could be made to FIG. 5. For example, although shown as a series of operations, various operations in FIG. 5 could overlap, occur in parallel, occur in a different order, or occur multiple times.

An example of a procedure in which a transmitting node transmits data based on a multi-path in a wireless communication system according to various embodiments of the present disclosure has been described with reference to FIG. 5, and another example of a scenario in which a transmitting node transmits data based on a multi-path in a wireless communication system according to various embodiments of the present disclosure will be described with reference to FIG. 6.

Figure 6:
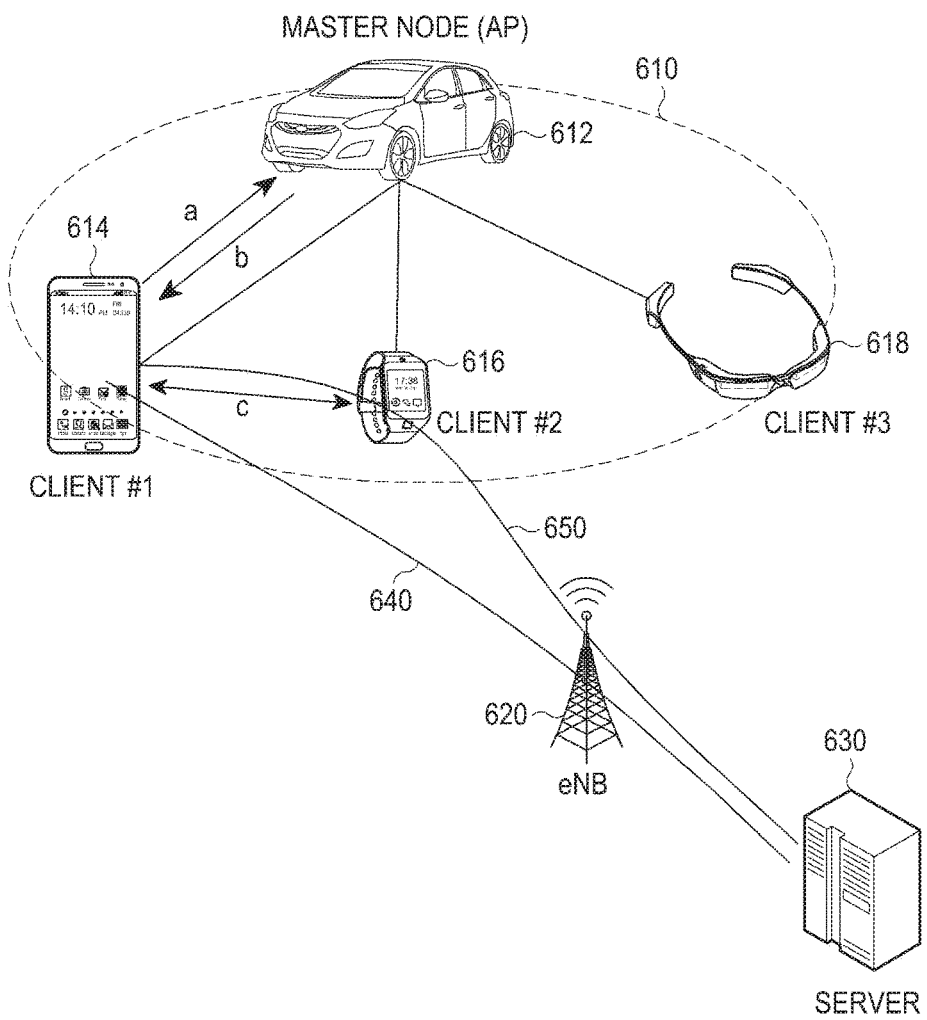
FIG. 6 schematically illustrates another example of a scenario in which a transmitting node transmits data based on a multi-path in a wireless communication system according to an embodiment of the present disclosure.

FIG. 6 schematically illustrates another example of a scenario in which a transmitting node transmits data based on a multi-path in a wireless communication system according to an embodiment of the present disclosure.

Referring to FIG. 6, a master node 612 may configure a small network 610 for transmitting uplink data based on an MPTCP. For configuring the small network 610, there is a need for performing an operation of selecting the master node 612. For example, it is preferable that a host with the highest capability among hosts which may configure the small network 610 is selected as the master node 612.

The hosts which may configure the small network 610 may connect one another based on a predetermined direct communication scheme and need to support a wireless communication service based on a public network such as a cellular network and/or the like. In a case that the small network 610 is configured by a plurality of hosts, e.g., a vehicle 612, a smart phone 614, smart glasses 618, and a smart watch 616, it is preferable that a master node is selected in an order of the vehicle 612, the smart phone 614, the smart glasses 618, and the smart watch 616 by hardware limitation. The master node 612 may be directly selected by a user terminal. That is, in the case that the small network 610 is configured by the vehicle 612, the smart phone 614, the smart glasses 618, and the smart watch 616, a user terminal may select the smart phone 614 as a master node.

A host selected as the master node 612, e.g., the vehicle 612 detects nodes 614, 616, and 618 located at the small network 610, and may configure the small network 610 by designating the detected nodes 614, 616, and 618 as clients.

According to an embodiment of the present disclosure, the master node 612 may perform a function as an AP in the small network 610. The master node 612 may periodically transmit an advertisement message in order that the nodes 614, 616, and 618 which join the small network 610 may try to connect to the master node 612. For example, if the wireless communication system supports an IEEE 802.11, the master node 612 may periodically transmit a beacon frame.

In this case, the nodes 614, 616, and 618 try to connect to the master node 612 in response to the reception of the advertisement message transmitted by the master node 612, and the small network 610 may be configured based on this.

After the configuration of the small network 610 has been completed, the master node 612 may acquire information about a wireless link characteristic and an E2E path characteristic, i.e., status information from each of one or more nodes. The status information corresponding to the information about the wireless link characteristic and the E2E path characteristic may be acquired by the master node 612 in real time. For example, the status information may include the information about the wireless link characteristic and the E2E path characteristic and computing resource information. The information about the wireless link characteristic may include at least one of RSRP, an RSRQ, an SINR, an MCS level, a service coverage, and a BER. The information about the E2E path characteristic may include at least one of TCP throughput, RTT, and a packet error rate. Further, the information related to the computing resource may be information about performance of each of an available central processing unit (CPU) and random access memory (RAM), and/or the like.

The master node 612 may generate a database based on the status information acquired from the one or more nodes, the information about the wireless link characteristic and the E2E path characteristic, and/or the like. An example of a characteristic database (e.g., an E2E path information table) per node and master node which is generated based on a wireless link characteristic and an E2E path characteristic which are based on a cellular network is expressed as Table 1.

TABLE 1

| characteristic | client 1 | client 1 | client 1 | AP (master) |
|---|---|---|---|---|
| cellular | RSRQ high | RSRQ mid | RSRQ low | RSRQ high |
| E2E | RTT small | RTT large | RTT mid | RTT small |

The node 614 having uplink data to be transmitted among the nodes 614, 616, and 618 configuring the small network 610 transmits a service request message (a) to the master node 612. Here, a node having uplink data to be transmitted among nodes included in a small network will be referred to as a service initiating node or a transmitting node. Upon requesting the service, the transmitting node may transfer information about a service requirement (hereinafter, it will be referred to as "information about a service requirement criterion") to the master node 612. For example, the information about the service requirement criterion may be defined based on a type of uplink data which the transmitting node 614 intends to transmit. The type of the uplink data may be determined based on a kind of an application to be used in the transmitting node 614 and the type of the uplink data may be a video, an image, a voice, and/or the like.

According to an embodiment of the present disclosure, the information about the service requirement criterion may include a Min throughput, a Max RTT, a high reliability indication, a minimum computing power, a maximum error tolerance rate, and/or the like. Each node may define service requirement information per application in advance.

According to an embodiment of the present disclosure, the transmitting node 614 may transfer service requirement information to the master node 612 performing an AP role based on a multi-path at time when a specific application which will transmit uplink data is started. For example, the transmitting node 614 may run a mobile broadcast application and transfer information about a service requirement criterion which is predefined for the started application to the master node 612 when running of the mobile broadcast application is requested. The transmitting node 614 may perform MPTCP capability check while transferring to the information about the service requirement criterion to the master node 612. The MPTCP capability check for the transmitting node 614 may be performed by the master node 612 when the information about the service requirement criterion is transferred from the transmitting node 614 to the master node 612.

The master node 612 may determine an optimal multi-path for the transmitting node 614 based on the information about the service requirement criterion transferred from the transmitting node 614 and the status information collected from the nodes. That is, the master node 612 may acquire additional path setup information for the transmitting node 614 based on the status information collected from the nodes 614, 616, and 618 and the information about the service requirement criterion from the transmitting node 614.

According to an embodiment of the present disclosure, the master node 612 may collect status information from each of the nodes 614, 616, and 618 configuring the small network 610. For example, the status information include throughput, RTT, reliability, computing capability, and/or the like.

Table 2 expresses an example of a database which the master node 612 generates and includes path information (e.g., service requirement information and information about a joining node) of each node and the master node 612.

TABLE 2

| Characteristic | client 1 | client 2 | client 3 | AP (master) |
|---|---|---|---|---|
| throughput | 10 Mbps | 2 Mbps | 5 Mbps | 20 Mbps |
| RTT | 50 ms | 100 ms | 50 ms | 200 ms |
| reliability | 0.1% PER | 1% PER | 2% PER | 5% PER |
| computing capability | 2 GHz Dual-core | 500 MHz Single-core | 1 GHz Single-core | 2.5 GHz Quad-core |

In Table 2, it will be understood that throughput and computing capability of the master node 612 are relatively good and RTT of the master node 612 is relatively bad. In Table 2, it will be understood that RTT of each of the first and third nodes 614 and 618 is relatively good and reliability of the first node 614 is the best.

According to an embodiment of the present disclosure, in a case that a multi-path is configured by two uplinks, the master node 612 may determine a node supporting the two uplinks configuring the multi-path based on a required characteristic.

Upon acquiring a Max throughput based on Table 2, the master node 612 may determine two uplinks configured by each of the master node 612 and the first node 614 as a multi-path for a transmitting node.

Upon acquiring a Min RTT based on Table 2, the master node 612 may determine two uplinks configured by each of the first node 614 and the third node 618 as a multi-path for a transmitting node.

Upon acquiring a high reliability indication based on Table 2, the master node 612 may determine two uplinks configured by each of the first node 614 and the second node 616 as a multi-path for a transmitting node.

Upon acquiring a Max computing capability based on Table 2, the master node 612 may determine two uplinks configured by each of the master node 612 and the first node 614 as a multi-path for a transmitting node.

According to an embodiment of the present disclosure, upon configuring a multi-path by considering explicit requirement per characteristic, the master node 612 may determine a node supporting two uplinks configuring a multi-path based on explicit requirement designated for one or more characteristics.

If explicit requirement is that the RTT is equal to or less than 100 ms, the master node 612 may determine three uplinks configured by each of the first node 614, the second node 616, and the third node 618 of which the RTT is equal to or less than 100 ms as a multi-path for a transmitting node.

The master node 612 transfers information (b) about a determined optimal multi-path to the transmitting node 614. If the master node 612 is a transmitting node, the master node 612 may omit an operation of receiving a service request message, and transferring information about an optimal multi-path in response to the service request message. In this case, the master node 612 knows service requirement information of the master node 612, so the master node 612 does not need to receive service requirement information from a transmitting node for determining a plurality of uplinks configuring a multi-path.

The transmitting node 614 may set up a direct path with at least one RN node 616 based on information about an optimal multi-path transferred from the master node 612. The transmitting node 614 may set up a path 640 via a cellular network 620 to connect to a server 630.

According to an embodiment of the present disclosure, the transmitting node 614 receives information about an RN from the master node 612. The information about the RN may be received when the information about the optimal multi-path is received.

The transmitting node 614 performs a procedure (c) for setting up a direct path with the RN 616 using the information about the RN received from the master node 612.

For example, the transmitting node 614 transmits a tunneled direct link setup (TDLS) request frame to the RN 616. The RN 616 transmits a TDLS response frame to the transmitting node 614 in response to the TDLS request frame. Upon receiving the TDLS response frame, the transmitting node 614 completes a setup procedure for a direct path by transferring a TDLS confirm frame to the RN 616. After the setup procedure for the direct path has been completed, the transmitting node 614 may transmit/receive data with the RN 616 through the direct path.

When the direct path with the RN 616 is set up, the transmitting node 614 may perform a procedure for setting up a path 650 corresponding to a new uplink connecting to a server 630 through the RN 616. The server 630 may be an MPTCP server/proxy.

The transmitting node 614 may perform congestion control for a multi-path formed by an existing uplink and at least one uplink which is newly set up, i.e., MPTCP congestion control based on the information about the optimal multi-path received from the master node 612. For example, the transmitting node 614 may perform congestion control for a multi-path for determining a data rate per path configuring a multi-path thereby maximizing life time.

According to an embodiment of the present disclosure, the transmitting node 614 may determine a data rate corresponding to each of a plurality of uplinks thereby maximizing life time per uplink configuring a multi-path.

In a case that two nodes join data transmission through two uplinks, consumption power in each of the first node, i.e., the transmitting node 614 and the second node, i.e., the RN 616 which correspond to the two nodes may be defined by Equation (1).

$$P_i = \alpha_u \cdot t_u + \alpha_d \cdot t_d + \beta \quad \text{Equation (1)}$$

In Equation (1), $\alpha_u \cdot t_u$ indicates power consumed for uploading data in the $i^{th}$ node (e.g., for transmitting uplink data), $\alpha_d \cdot t_d$ indicates power consumed for downloading data in the $i^{th}$ node (e.g., for receiving downlink data), and $\beta$ indicates constant consumption power. In Equation (1), $t_u$ indicates a unit data rate of uplink data, $\alpha_u$ indicates power consumed per unit data rate of uplink data, $t_d$ indicates a unit data rate of downlink data, and $\alpha_d$ indicates power consumed per unit data rate of downlink data. In Equation (1), it will be understood that power consumption in an uplink/downlink is increased or decreased in proportional to a data rate.

For example, power consumption per wireless communication scheme may be defined as Table 3.

TABLE 3

| | $\alpha_u$ | $\alpha_d$ | $\beta$ | $\alpha_u/\alpha_d$ |
|---|---|---|---|---|
| LTE | 438.39 | 51.97 | 1288.04 | 8.44 |
| 3G | 868.98 | 122.12 | 817.88 | 7.12 |
| Wi-Fi | 283.17 | 137.01 | 132.86 | 2.07 |

An example of consumption power per wireless communication scheme defined in Table 3 has been described with reference to "A Close Examination of Performance and Power Characteristics of 4G LTE Networks", ACM Mobi-Sys'12". In Table 3, a modulator/de-modulator (MODEM) chips are an LTE chip, a 3G chip, and a Wi-Fi chip. However, consumption power in another MODEM chip supporting another wireless communication scheme may be additionally defined.

In Table 3, it will be understood that consumption power in an LTE scheme is less than consumption power in a 3G scheme, and consumption power in a Wi-Fi scheme is the least in a case that uplink/downlink data is transmitted/received. However, it will be understood that consumption power in an LTE scheme is the least, and consumption power in a Wi-Fi scheme is the most in a case that data is received. Further, it will be understood that constant consumption power in the LTE scheme is significantly greater than constant consumption power in other schemes.

In a case that consumption power in a node is as described above, a life time T1 of a transmitting node and a life time T2 of an RN may be determined based on Equation (2).

$$T1 = E1/(D1 \cdot Pcu1 + D2 \cdot Pwu1)$$

$$T2 = E2/(D2 \cdot Pwd2 + D2 \cdot Pcu2) \quad \text{Equation (2)}$$

In Equation (2), Ei indicates battery remaining energy of the $i^{th}$ node (e.g., a transmitting node or an RN), Pcui indicates consumption power for the $i^{th}$ node to transmit data through a uplink of a cellular network, Pcdi indicates consumption power for the $i^{th}$ node to transmit data through a downlink of the cellular network, Pwui indicates consumption power for the $i^{th}$ node to transmit uplink data through a direct path, and Pwdi indicates consumption power for the $i^{th}$ node to transmit downlink data through the direct path. In Equation (2), Di indicates a data rate on the $i^{th}$ uplink.

For example, each of Pcu1, Pwu1, Pwd2, and Pcu2 may be defined as Equation (3).

$$Pcu1 = a \times D1 + b$$

$$Pwu1 = c \times D1 + d$$

$$Pwd2 = e \times D2 + f$$

$$Pcu2 = g \times D2 + h \quad \text{Equation (3)}$$

In Equation (3), D1 indicates a data rate for the first uplink, and D2 indicates a data rate for the second uplink. Further, each of a to h indicates a preset weight for calculating consumption power for transmitting uplink/downlink data in each multi-path.

Optimization of life time which corresponds to each of the first node and the second node may be generalized as expressed in Equation (4) and Equation (5).

$$\text{Max Min}\{T1, T2\} \quad \text{Equation (4)}$$

$$0 \leq D1 \leq D1\text{max}$$

$$0 \leq D2 \leq D2\text{max} \quad \text{Equation (5)}$$

In Equation (5), the D1max denotes a maximum upload throughput of the first node, and the D2max denotes a maximum upload throughput of the second node.

Finally, a criterion of optimizing life time will be "T1=T2". If "D (=D1+D2)=30 Mbps" and "D1max=D2max=20 Mbps" are given, D1 and D2 which make to be "T1=T2" may be detected by solving a quadratic equation.

Table 4 expresses an example of D1 and D2 detected according to remaining energy of a node.

TABLE 4

| Ratio of remaining energy | Data rate |
|---|---|
| E1 = E2 = E | D1 = 13.7 Mbps, D2 = 16.3 Mbps |
| E1 = E, E2 = E/2 | D1 = 17.8 Mbps, D2 = 12.2 Mbps |
| E1 = E, E2 = E/10 | D1 = 20 Mbps, D2 = 10 Mbps |
| E1 = E, E2 = E/20 | D1 = 20 Mbps, D2 = 10 Mbps |
| E1 = E/2, E2 = E | D1 = 5.5 Mbps, D2 = 14.5 Mbps |

According to Table 4, a data rate to be allocated according to remaining energy of each of the first node and the second node may be varied. So, if the second node periodically provides information about remaining energy E2 and an available maximum data rate D2max, the first node may determine a data rate which corresponds to each uplink according to congestion control based on Equations as described above.

Through optimization of life time, the transmitting node 614 may acquire data amount D1 which the transmitting node 614 will directly transmit through an uplink and data amount D2 which the transmitting node 614 will transmit through an uplink via the RN 616 which is connected to the transmitting node 614 through a direct link.

For congestion control, the transmitting node 614 determines whether amount Q of data buffered at a transmission layer of the transmitting node 614, i.e., amount Q of data to be transmitted through an uplink is greater than a preset threshold value Qth. That is, the transmitting node 614 determines whether Q>Qth. The transmitting node 614 may transmit a data of which amount corresponds to difference between the amount Q of the buffered data and the preset threshold value Qth through a newly connected uplink.

Another example of the congestion control may be defined as a pseudo code in Table 5.

TABLE 5

For every RTT1 do:
   If Q > Qth
      The subflow 2's cwnd = (Q−Qth) × RTT2/RTT1
      The subflow 1's cwnd = Qth
   Else
      The subflow 2's cwnd = 0
      The subflow 1's cwnd = Q
Done According to Table 5, if amount Q of data to be transmitted through an uplink is greater than a preset threshold value Qth (that is, Q>Qth), a cwnd size for a new path, i.e., an additional path may be determined. In Table 5, a cwnd size for an additional path is expressed as "subflow 2's cwnd". For example, the cwnd size for the additional path may be calculated by '(Q−Qth)×RTT2/RTT1'. Here, Q indicates amount of data to be transmitted to a receiving node, Qth indicates a preset threshold value, RTT1 indicates RTT which corresponds to an initial path, and RTT2 indicates RTT which corresponds to an initial path.

When the cwnd size for the additional path (e.g., a subflow 2's cwnd) is determined, a cwnd size (e.g., a cwnd 1) used in an initial path, e.g., a subflow 1 may be adjusted to a preset threshold value Qth. In Table 5, a cwnd size for an initial path is expressed as "subflow 1's cwnd".

if the amount Q of the data to be transmitted through the uplink is not greater than the preset threshold value Qth, the cwnd size for the additional path subflow 2's cwnd may be set to '0', and the cwnd size (e.g., a cwnd 1) used in the initial path (e.g., a subflow 1) will be maintained as the preset threshold value Q. Generally, setting a cwnd size to '0' means that data transmission is not performed through a corresponding path.

An equation for acquiring a cwnd 2 proposed in Table 2 may be derived as expressed in Table 6.

TABLE 6

D = D1 + D2
D = CWND1/RTT1 + CWND2/RTT2
D×RTT1 = CWND1 + CWND2/RTT2 × RTT1
CWND2 = (D×RTT1 − CWND1) × RTT2/RTT1
CWND2 = (Received Data − Qth) × RTT2/RTT1
//Qth1 is defined as a size which may be processed during RTT1 on a Subflow 1
CWND2 = (Q−Qth) × RTT2/RTT1

Here, throughput of a TCP may be defined as window/RTT.

In table 6, total data rate D from the transmitting node 614 to the sever 630 may be defined by a sum of a data rate D1 on an initial path, e.g., a subflow 1 and a data rate D2 on an additional path, e.g., a subflow 2. Generally, a data rate may be defined by a ratio of a cwnd to RTT.

So, the data rate D1 on the subflow 1 may be defined as 'cwnd 1/RTT 1', and the data rate D2 on the subflow 2 may be defined as 'cwnd 2/RTT 2'. So, the total data rate D may be defined as 'cwnd 1/RTT 1+cwnd 2/RTT 2'.

Further, D×RTT1 may be defined as 'cwnd 1+cwnd 2/(RTT2×RTT1)'. The cwnd 2 may be defined as '(D×RTT1−cwnd 1)×(RTT2/RTT1)' based on the definition. That is, the cwnd 2 may be summarized as '(Received Data−Qth)×(RTT2/RTT1)'.

For example, in a case that Qth1 is defined as amount of data which may be processed during RTT 1 in a subflow 1, a cwnd 2 may be defined as '(Q−Qth)×RTT2/RTT1.

Another example of a scenario in which a transmitting node transmits data based on a multi-path in a wireless communication system according to various embodiments of the present disclosure has been described with reference to FIG. 6, and still another example of a scenario in which a transmitting node transmits data based on a multi-path in a wireless communication system according to various embodiments of the present disclosure will be described with reference to FIG. 7.

Figure 7:
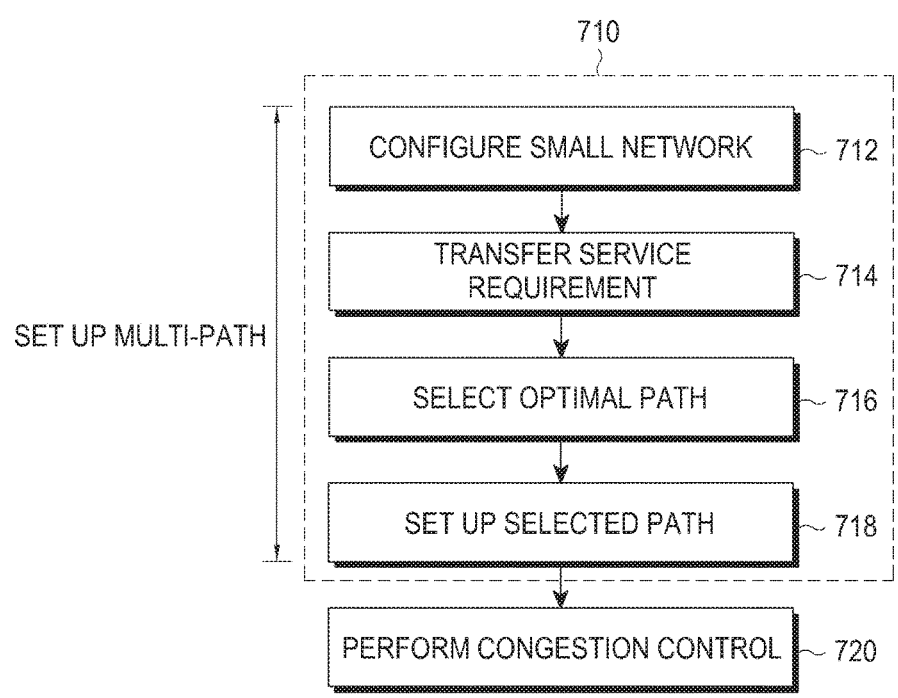
FIG. 7 schematically illustrates still another example of a scenario in which a transmitting node transmits data based on a multi-path in a wireless communication system according to an embodiment of the present disclosure.

FIG. 7 schematically illustrates still another example of a scenario in which a transmitting node transmits data based on a multi-path in a wireless communication system according to an embodiment of the present disclosure.

Referring to FIG. 7, a master node may set up a multi-path at operation 710. A master node may configure a small network for transmitting uplink data based on an MPTCP at operation 712. The master node may be a node with the best performance or a node selected by a user terminal among nodes located within the small network. The master node detect nodes located in the small network, and may configure the small network by designating the detected nodes as clients.

According to an embodiment of the present disclosure, a master node may perform a function as an AP in a small network. That is, the master node may periodically transmit an advertisement message in order that nodes may try to connect the master node. For example, if the wireless communication system supports an IEEE 802.11, the master node may periodically transmit a beacon frame.

In this case, the nodes try to connect to the master node in response to the reception of the advertisement message transmitted by the master node, and the small network may be configured based on this.

After the small network is configured, the master node may acquire status information from each of one or more nodes. The status information may be acquired by the master node in real time. For example, the status information may include information about a wireless link characteristic and an E2E path characteristic and computing resource information. The information about the wireless link characteristic may include at least one of RSRP, an RSRQ, an SINR, an MCS level, a service coverage, and a BER. The information about the E2E path characteristic may include at least one of TCP throughput, RTT, and a packet error rate. The computing resource information may be information about performance of each of an available CPU and RAM, and/or the like.

The master node may receive a service request message from a transmitting node at operation 714. The service request message may include information about a service requirement criterion by the transmitting node. For example, the information about the service requirement criterion may be defined by a type of uplink data (e.g., a service type) which the transmitting node intends to transmit. The type of the uplink data may be determined by a kind of an application to be used in the transmitting node, and/or the like, and may be, for example, a video, an image, a voice, and/or the like.

According to an embodiment of the present disclosure, the information about the service requirement criterion may include a Min throughput, a Max RTT, a high reliability indication, a min computing power, a maximum error tolerance rate, and/or the like. Each node may define service requirement information per application in advance.

According to an embodiment of the present disclosure, a master node may receive information about a service requirement criterion from a transmitting node before a service selected by the transmitting node is initiated.

For example, upon receiving request of running a mobile broadcast application, the transmitting node may run the mobile broadcast application and transmit information about a service requirement criterion which is predefined for the mobile broadcast application to the master node. The transmitting node may perform MPTCP capability check at time when the information about the service requirement criterion is transmitted to the master node. The MPTCP capability check for the transmitting node may be performed by the master node at time when the master node receives the information about the service requirement criterion from the transmitting node.

The master node may select an optimal additional path for the transmitting node based on the information about the service requirement criterion received from the transmitting node and status information collected from nodes at operation 716. That is, the master node may acquire an optimal RN for the transmitting node based on the status information collected from the nodes and the information about the service requirement criterion received from the transmitting node.

The transmitting node may set up the additional path selected as the optimal path at operation 718. For example, the transmitting node may set up the additional path selected by the master node by setting up a direct path with the selected RN.

The transmitting node may perform congestion control for the setup multi-path at operation 720. The congestion control may be that traffic distribution for transmitting a part of data transmitted through an existing path through a new additional path is performed.

According to an embodiment of the present disclosure, the transmitting node may receive status information from the RN to which the direct path is connected. The status information from the RN may include information about battery remaining energy of the RN.

The transmitting node may determine whether to use an additional path by considering traffic amount to be transmitted to a receiving node. The additional path is a transmission path connecting the receiving node via an RN to which a direct path is connected. For example, the transmitting node may determine whether to use the additional path by setting a threshold value by considering a maximum life time predicted by battery remaining energy of the transmitting node and battery remaining energy of the RN, and determining whether the traffic amount to be transmitted to the receiving node is greater than the set threshold value.

Upon determining to use the additional path, the transmitting node may determine a twnd size for setting a data rate on the additional path based on the status information received from the RN. For example, the transmitting node calculates the first twnd size based on a data rate which is estimated corresponding to each of an initial path and an additional path and amount of traffic according to data transmission to the receiving node, calculates the second twnd size based on RTT corresponding to each of the initial path and the additional path, the traffic amount according to the data transmission to the receiving node, and the set threshold value, and determine the smaller one of the first twnd size and the second twnd size as the twnd size.

The transmitting node may transmit data to the RN through the direct path using the determined twnd size.

Although FIG. 7 illustrates still another example of a scenario in which a transmitting node transmits data based on a multi-path in a wireless communication system according to various embodiments of the present disclosure, various changes could be made to FIG. 7. For example, although shown as a series of operations, various operations in FIG. 7 could overlap, occur in parallel, occur in a different order, or occur multiple times.

Still another example of a scenario in which a transmitting node transmits data based on a multi-path in a wireless communication system according to various embodiments of the present disclosure has been described with reference to FIG. 7, and an example of a scenario in which a transmitting node provides information about a service requirement criterion to a master node in a wireless communication system according to various embodiments of the present disclosure will be described with reference to FIG. 8.

Figure 8:
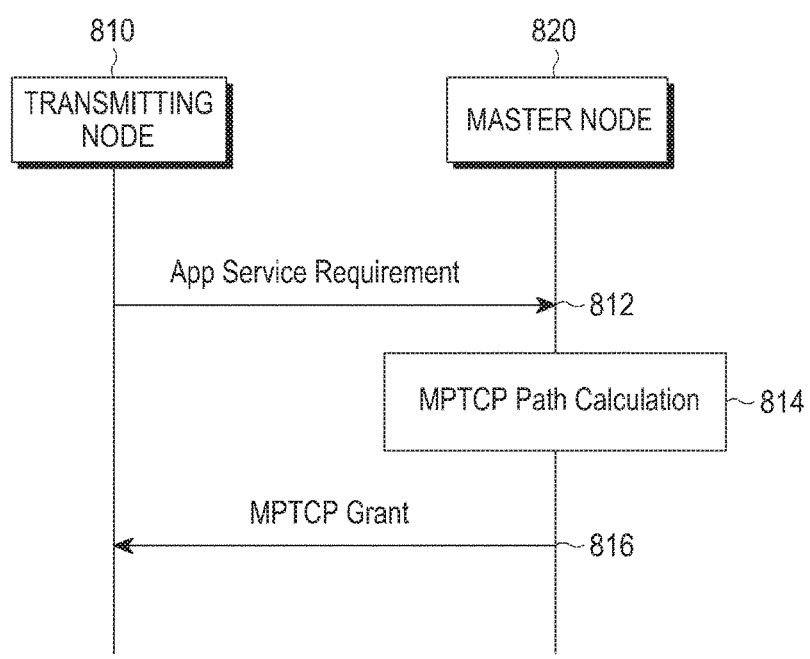
FIG. 8 schematically illustrates an example of a scenario in which a transmitting node provides information about a service requirement criterion to a master node in a wireless communication system according to an embodiment of the present disclosure.

FIG. 8 schematically illustrates an example of a scenario in which a transmitting node provides information about a service requirement criterion to a master node in a wireless communication system according to an embodiment of the present disclosure.

Referring to FIG. 8, a transmitting node 810, e.g., a client 1 transmits an application service request message requesting a desired service, e.g., a desired application to a master node 820 before initiating the service at operation 812. The application service request message may include information about a service requirement criterion. The information about the service requirement criterion has been described above, so a detailed description thereof will be omitted herein.

After receiving the application service request message from the transmitting node 810, the master node 820 may select a multi-path, e.g., an MPTCP path based on the information about the service requirement criterion included in the received application service request message at operation 814. That is, the master node 820 may select the MPTCP path based on MPTCP path calculation.

The master node 820 may permit to use the multi-path after selecting the multi-path at operation 816. The master node 820 may provide information about the multi-path selected when permitting to use the multi-path to the transmitting node 810. For example, the information about the selected multi-path may be transmitted through an MPTCP grant.

An example of a scenario in which a transmitting node provides information about a service requirement criterion to a master node in a wireless communication system according to various embodiments of the present disclosure has been described with reference to FIG. 8, and a procedure for a direct connection between a transmitting node and an RN in a wireless communication system according to various embodiments of the present disclosure will be described with reference to FIG. 9.

Figure 9:
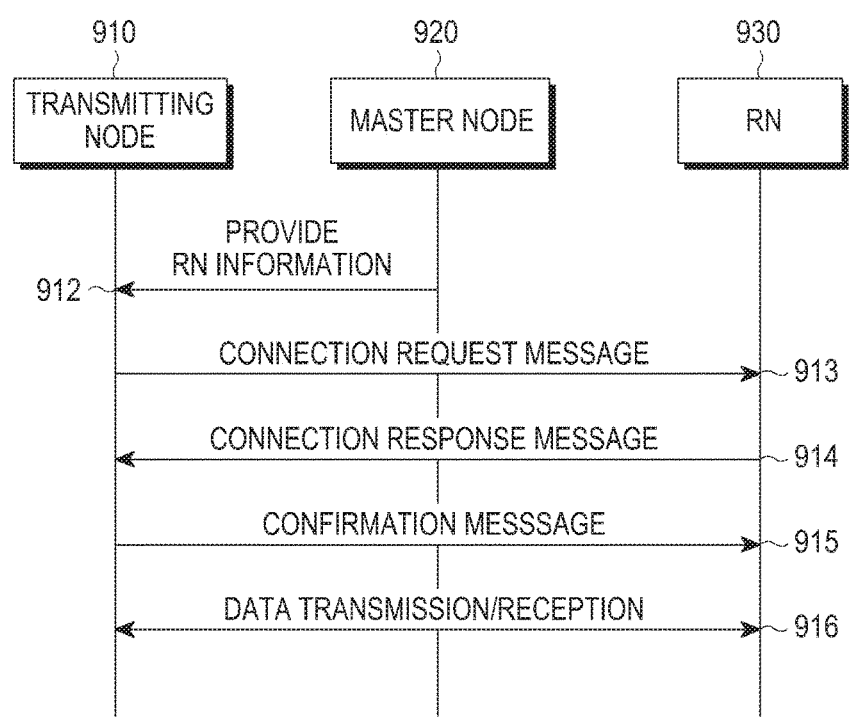
FIG. 9 schematically illustrates a procedure for a direct connection between a transmitting node and a relay node (RN) in a wireless communication system according to an embodiment of the present disclosure.

FIG. 9 schematically illustrates a procedure for a direct connection between a transmitting node and an RN in a wireless communication system according to an embodiment of the present disclosure.

Referring to FIG. 9, a master node 920 may provide information about an optimal RN selected by the master node 920 to a transmitting node 910 at operation 912. The information about the optimal RN may include identification information designating the selected RN.

The transmitting node 910 transmits a TDLS request message as a connection request message for requesting a direct connection to an RN 930 at operation 913. The RN 930 may transmit a TDLS response message as a response message to the TDLS request message to the transmitting node 910 at operation 914. Upon receiving the TDLS response message, the transmitting node 910 may transmit a TDLS confirmation message as a confirmation message to the RN 930 at operation 915 thereby completing a setup procedure for a direct path between the transmitting node 910 and the RN 930. After the setup procedure for the direct path has been completed, the transmitting node 910 may transmit/receive data with the RN 930 through the direct path at operation 916.

Although FIG. 9 illustrates a procedure for a direct connection between a transmitting node and an RN in a wireless communication system according to various embodiments of the present disclosure, various changes could be made to FIG. 9. For example, although shown as a series of operations, various operations in FIG. 9 could overlap, occur in parallel, occur in a different order, or occur multiple times.

A procedure for a direct connection between a transmitting node and an RN in a wireless communication system according to various embodiments of the present disclosure has been described with reference to FIG. 9, and an example of setting up a path based on an MPTCP in a wireless communication system according to various embodiments of the present disclosure will be described with reference to FIG. 10.

Figure 10:
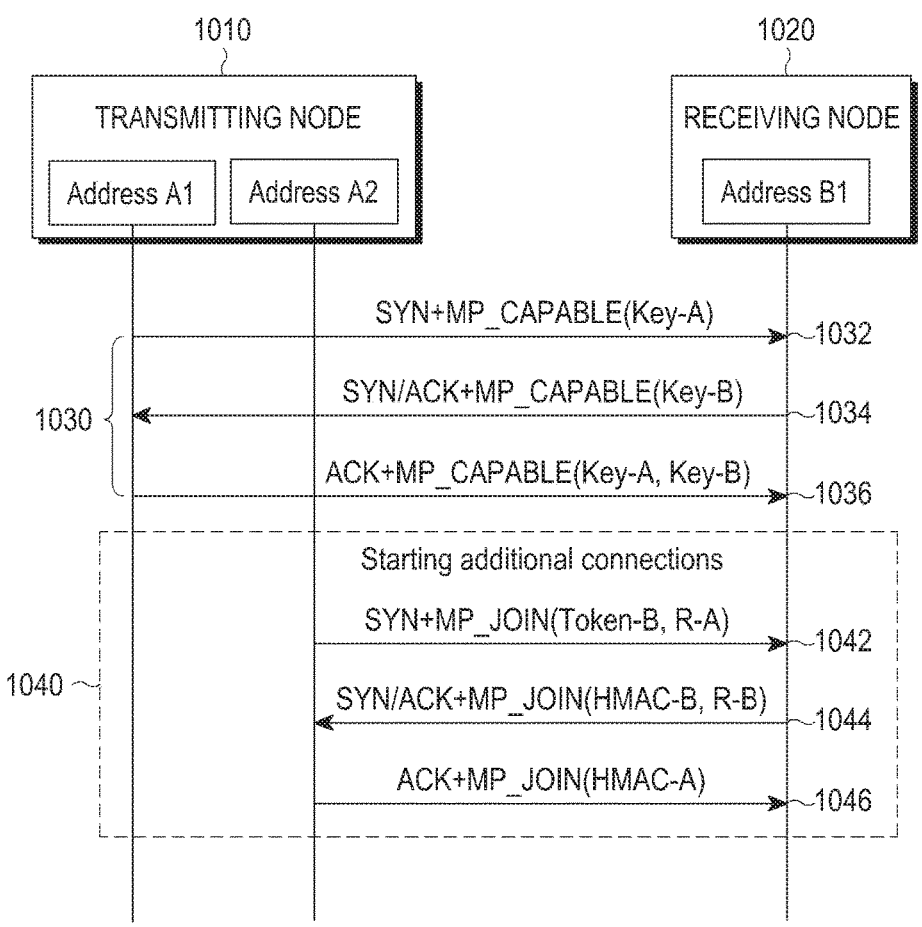
FIG. 10 schematically illustrates an example of setting up a path based on an MPTCP in a wireless communication system according to an embodiment of the present disclosure.

FIG. 10 schematically illustrates an example of setting up a path based on an MPTCP in a wireless communication system according to an embodiment of the present disclosure.

Referring to FIG. 10, in an MPTCP, an MP_CAPABLE header or an MP_JOIN header may be used for connecting a new path. For example, a transmitting node 1010 may inform that an initial path or an additional path is connected through an MP_CAPABLE message or an MP_JOIN message when the initial path or the additional path is connected. For example, if the initial path is connected, the MP_CAPABLE message may be used. If the additional path is connected, the MP_JOIN message may be used.

According to an embodiment of the present disclosure, an initial path may be connected by a 3-way handshake process 1030. Messages exchanged during the 3-way handshake process, i.e., operations 1032 to 1036 in FIG. 10, e.g., an SYN+MP_CAPABLE message, an SYN/ACK+MP_CAPABLE message, and an ACK+MP_CAPABLE message may include an MP_CAPABLE header. In this process, the transmitting node 1010 and a receiving node 1020 may perform an authentication operation by exchanging keys for an MP_CAPABLE header, e.g., Key-A and Key-B. At this time, another path connecting two hosts, i.e., the transmitting node 1010 and the receiving node 1020 does not exist, so data transmission may be performed through a path which is connected as described above.

After initial path is connected, the transmitting node 1010 and the receiving node 1020 may perform a procedure for setting up an additional path at operation 1040. For example, the transmitting node 1010 may transmit an SYN+MP_JOIN message (Token-B, R-A) based on an IP address allocated by a master node, e.g., an address A2 to the receiving node 1020 at operation 1042. The receiving node 1020 may transmit an SYN/ACK+MP_JOIN message (HMAC-B, R-B) to the transmitting node 1010 as a confirmation message in response to the SYN+MP_JOIN message at operation 1044. The transmitting node 1010 may complete a setup procedure for a path which corresponds to a new uplink by transmitting an ACK+MP_JOIN message (HMAC-A) as a response message to the confirmation message received from the receiving node 1020 at operation 1046.

According to an embodiment of the present disclosure, when there is an existing path between two hosts, i.e., the transmitting node 1010 and the receiving node 1020, an additional path may be connected by including an MP_JOIN header into a 4-way handshake message. At this time, a hash-based authentication operation is performed using a hash-based message authentication code (HMAC) information included in the MP_JOIN header.

Although FIG. 10 illustrates an example of setting up a path based on an MPTCP in a wireless communication system according to various embodiments of the present disclosure, various changes could be made to FIG. 10. For example, although shown as a series of operations, various operations in FIG. 10 could overlap, occur in parallel, occur in a different order, or occur multiple times.

An example of setting up a path based on an MPTCP in a wireless communication system according to various embodiments of the present disclosure has been described with reference to FIG. 10, and an example of resource allocation corresponding to a multi-path set up between two hosts in a wireless communication system according to various embodiments of the present disclosure will be described with reference to FIG. 11.

Figure 11:
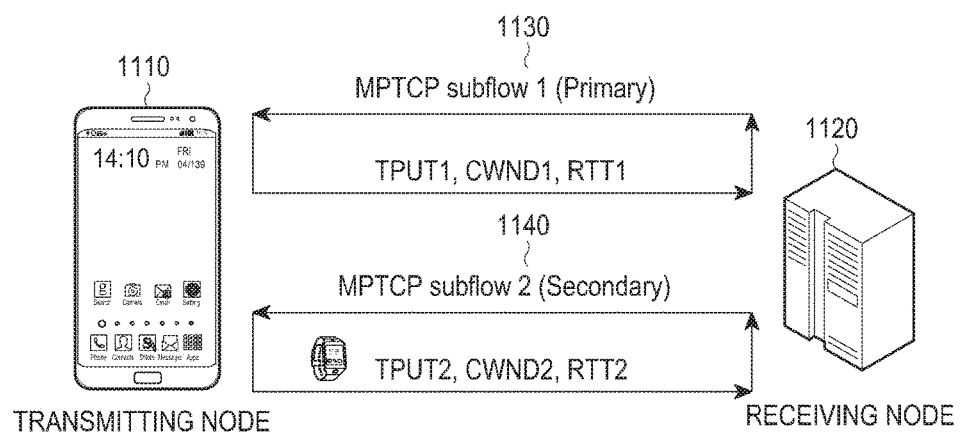
FIG. 11 schematically illustrates an example of resource allocation corresponding to a multi-path set up between two hosts in a wireless communication system according to an embodiment of the present disclosure.

FIG. 11 schematically illustrates an example of resource allocation corresponding to a multi-path set up between two hosts in a wireless communication system according to an embodiment of the present disclosure.

Referring to FIG. 11, a connection by a primary path, e.g., an MPTCP subflow 1 1130 and a secondary path, an MPTCP subflow 2 1140 is set up between a transmitting node 1110 and a receiving node 1120. For example, it will be understood that a cwnd 1 and RTT 1 are allocated to the MPTCP subflow 1 1130 thereby throughput TPUT1 (=cwnd1/RTT1) is achieved, and a cwnd 2 and RTT 2 are allocated to the MPTCP subflow 2 1140 thereby throughput TPUT2 (=cwnd2/RTT2) is achieved.

An example of resource allocation corresponding to a multi-path set up between two hosts in a wireless communication system according to various embodiments of the present disclosure has been described with reference to FIG. 11, and an inner structure of an apparatus of performing congestion control for a multi-path in a wireless communication system according to various embodiments of the present disclosure will be described with reference to FIG. 12.

Figure 12:
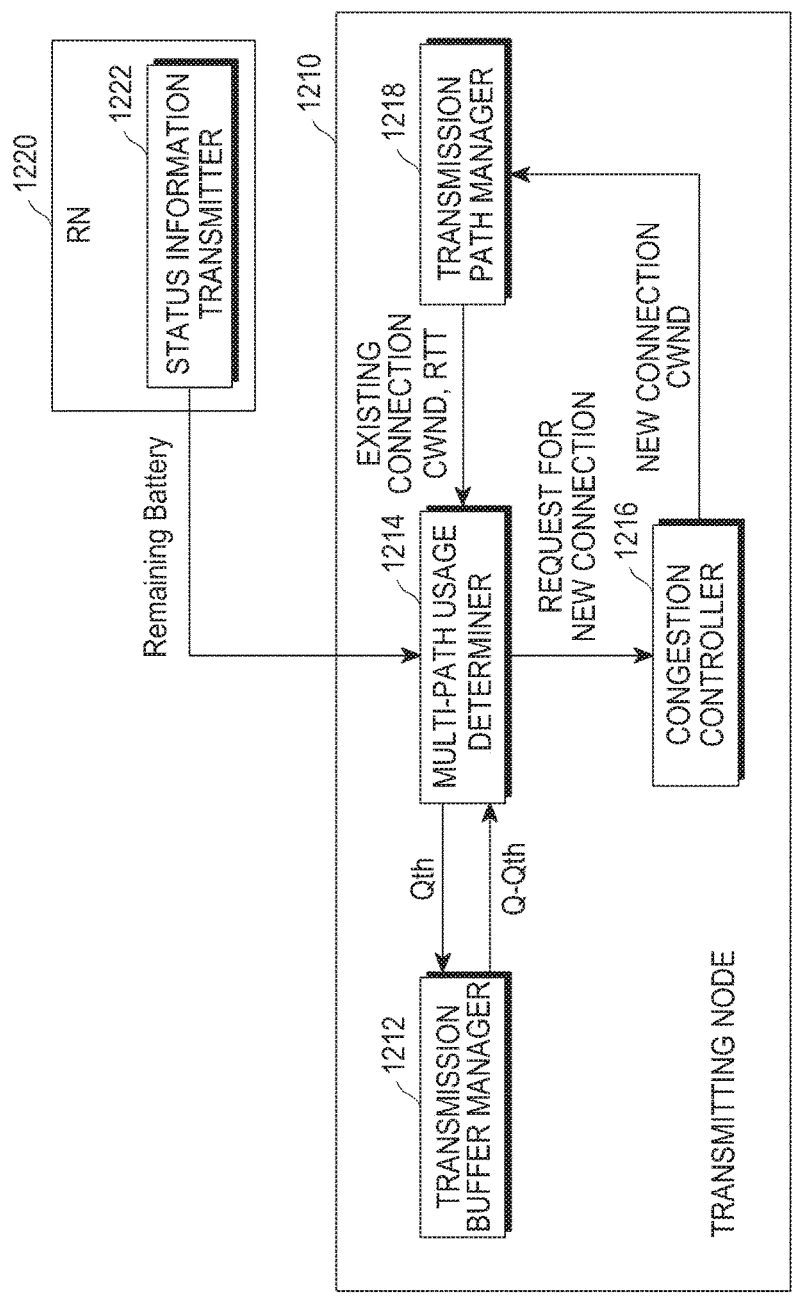
FIG. 12 schematically illustrates an inner structure of an apparatus of performing congestion control for a multi-path in a wireless communication system according to an embodiment of the present disclosure.

FIG. 12 schematically illustrates an inner structure of an apparatus of performing congestion control for a multi-path in a wireless communication system according to an embodiment of the present disclosure.

Referring to FIG. 12, an apparatus of performing congestion control for a multi-path may be, for example, a transmitting node 1210 and an RN 1220.

The transmitting node 1210 may include a transmission buffer manager 1212, a multi-path usage determiner 1214, a congestion controller 1216, and a transmission path manager 1218, and the RN 1220 may include a status information transmitter 1222.

The status information transmitter 1222 in the RN 1220 may transfer status information to the transmitting node 1210 to which a direct path is connected.

The multi-path usage determiner 1214 may receive status information from the RN 1220 for which a direct path is set up. For example, the status information may include information as to remaining energy in a battery of the RN 1220. For a direct connection with the RN 1220, additional path setup information received from a master node configuring a small network may be used.

The multi-path usage determiner 1214 may determine to use an additional path connecting to a receiving node via the RN 1220 for which the direct path is set up by considering traffic amount according to data transmission to a receiving node.

If the multi-path usage determiner 1214 determines to use the additional path, the congestion controller 1216 may determine a twnd size for setting a data rate on an additional path and a twnd size for setting a data rate on an initial path based on the status information received from the RN 1220.

According to an embodiment of the present disclosure, the congestion controller 1216 may calculate the twnd size for the additional path based on data amount to be transmitted to a receiving node, a preset threshold value, and RTT corresponding to each of the initial path and the additional path. The congestion controller 1216 may determine the smaller one of the twnd size used on the initial path and the calculated twnd size for the additional path as a final twnd size for the additional path.

The multi-path usage determiner 1214 may set a threshold value by considering a maximum life time predicted by battery remaining battery of the transmitting node 1210 and battery remaining battery of the RN 1220. The multi-path usage determiner 1214 may determine to use an additional path if traffic amount according to data transmission to the receiving node is greater than the set threshold value.

The transmission path manager 1218 may manage data transmission to the RN 1220 through a direct path using the final twnd size determined by the congestion controller 1216.

The transmission buffer manager 1212 may manage an output of data stored in a transmission buffer based on traffic amount according to data transmission to the receiving node and the threshold value set by the multi-path usage determiner 1214.

While the transmission buffer manager 1212, the multi-path usage determiner 1214, the congestion controller 1216, and the transmission path manager 1218 are described in the transmitting node 1210 as separate units, it is to be understood that this is merely for convenience of description. In other words, two or more of the transmission buffer manager 1212, the multi-path usage determiner 1214, the congestion controller 1216, and the transmission path manager 1218 may be incorporated into a single unit.

The transmitting node 1210 may be implemented with one processor.

Figure 13:
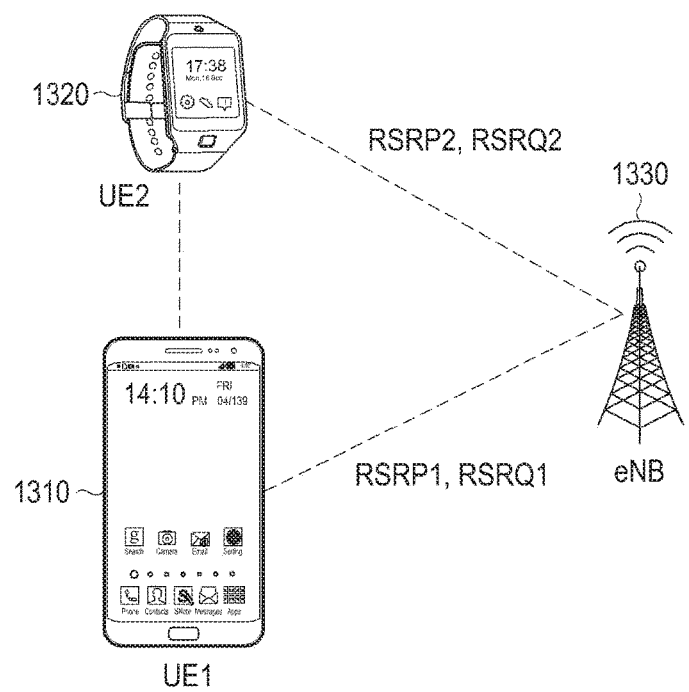
FIG. 13 schematically illustrates an example of a case that a transmitting node and an RN use the same operator on a multi-path in a wireless communication system according to an embodiment of the present disclosure.
Figure 14:
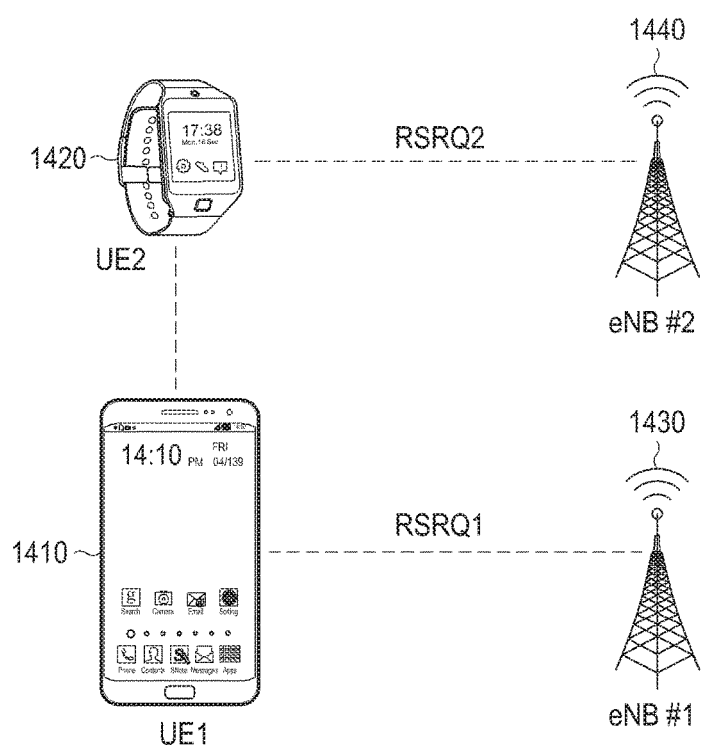
FIG. 14 schematically illustrates an example of a case that a transmitting node and an RN use different operators in a multi-path in a wireless communication system according to an embodiment of the present disclosure.

Further, an apparatus of performing congestion control for a multi-path in a wireless communication system according to various embodiments of the present disclosure may include a transceiver configured to receive and transmit at least one message or at least one signal, and at least one processor configured to perform an operation proposed in various embodiments of the present disclosure as described in FIGS. 1 to 11, and to be described in FIGS. 13 and 14.

An inner structure of an apparatus of performing congestion control for a multi-path in a wireless communication system according to various embodiments of the present disclosure has been described with reference to FIG. 12, and an example of a case that a transmitting node and an RN use the same operator on a multi-path in a wireless communication system according to various embodiments of the present disclosure will be described with reference to FIG. 13.

FIG. 13 schematically illustrates an example of a case that a transmitting node and an RN use the same operator on a multi-path in a wireless communication system according to an embodiment of the present disclosure.

Referring to FIG. 13, if a transmitting node, e.g., a UE1 1310 and an RN, e.g., a UE2 1320 use the same operator, it is determined whether RSRP 1 on an initial path connecting the UE1 1310 and an eNB, e.g., an eNB 1330 is equal to RSRP 2 on an additional path connecting the UE2 1320 and the eNB 1330.

If the RSRP 1 is equal to the RSRP 2, a data rate in the UE1 1310 may be set to a data rate equal to a data rate in the UE2 1320. For example, the UE1 1310 and the UE2 1320 may transmit data using the same twnd size.

If the RSRP 1 is unequal to the RSRP 2, it is determined whether an RSRQ 1 on the initial path connecting the UE1 1310 and the eNB 1330 is less than an RSRQ 2 on the additional path connecting the UE2 1320 and the eNB 1330.

If the RSRQ 1 is less than the RSRQ 2, the data rate in the UE2 1320 may be set to a data rate greater than the data rate in the UE1 1310.

If the RSRQ 1 is not less than the RSRQ 2, the data rate in the UE1 1310 may be set to a data rate greater than the data rate in the UE2 1320.

An example of a case that a transmitting node and an RN use the same operator in a multi-path in a wireless communication system according to various embodiments of the present disclosure has been described with reference to FIG. 13, and an example of a case that a transmitting node and an RN use different operators in a multi-path in a wireless communication system according to various embodiments of the present disclosure will be described with reference to FIG. 14.

FIG. 14 schematically illustrates an example of a case that a transmitting node and an RN use different operators in a multi-path in a wireless communication system according to an embodiment of the present disclosure.

Referring to FIG. 14, if a transmitting node, e.g., a UE1 1410 and an RN, e.g., a UE2 1420 use different operators, it is determined whether an RSRQ 1 on an initial path connecting the UE1 1410 and the first eNB, e.g., an eNB#1 1430 is equal to an RSRQ 2 on an additional path connecting the UE2 1420 and the second eNB, e.g., an eNB#2 1440.

If the RSRQ 1 is equal to the RSRQ 2, a data rate in the UE1 1410 may be equal to a data rate in the UE2 1420.

If the RSRQ 1 is unequal to the RSRQ 2, it is determined whether the RSRQ 1 on the initial path connecting the UE1 1410 and the eNB#1 1430 is less than the RSRQ 2 on the additional path connecting the UE2 1420 and the eNB#2 1440.

If the RSRQ 1 is less than the RSRQ 2, the data rate in the UE2 1420 may be greater than the data rate in the UE1 1410.

If the RSRQ 1 is not less than the RSRQ 2, the data rate in the UE1 1410 may be greater than the data rate in the UE2 1420.

As is apparent from the foregoing description, an embodiment of the present disclosure enables to maximize usage efficiency of a multi-path by setting up the multi-path thereby satisfying a service requirement criterion of a client terminal (or a transmitting node). This may decrease power consumption of a transmitting client terminal and a relay client terminal which join data transmission/reception based on a multi-path and enhance a quality of experience (QoE) of a user.

An embodiment of the present disclosure enables to manage congestion in a wireless communication system.

An embodiment of the present disclosure enables to manage congestion for a multi-path in a wireless communication system transmitting data through the multi-path.

An embodiment of the present disclosure enables to allocate a data rate for each of transmission paths included in a multi-path in a wireless communication system transmitting data through the multi-path.

An embodiment of the present disclosure enables to determine throughput for each of a plurality of TCP connections included in a multi-path in a client terminal in a case that an MPTCP is used in the multi-path including a wireless link in a wireless communication system transmitting data through the multi-path.

An embodiment of the present disclosure enables to perform congestion control for a multi-path by considering a situation of another client terminal in a client terminal supporting an MPTCP based on the multi-path including at least one transmission path via the another client terminal.

An embodiment of the present disclosure enables to perform congestion control for a multi-path by considering energy efficiency of another client terminal in a client terminal supporting an MPTCP based on the multi-path including at least one transmission path via the another client terminal.

An embodiment of the present disclosure enables to perform congestion control for a multi-path thereby maximizing life time during which data transmission/reception through the multi-path is possible in a client terminal supporting an MPTCP based on the multi-path including at least one transmission path via another client terminal.

An embodiment of the present disclosure enables to transmit and receive data through at least one transmission path via another terminal by considering a congestion situation of a transmission path supporting a direct communication included in a multi-path in a client terminal supporting an MPTCP based on the multi-path including at least one transmission path via the another client terminal.

An embodiment of the present disclosure enables to control congestion in a client terminal thereby maximizing life time during which data is transmitted/received based on a multi-path by considering battery status and radio link characteristics of a plurality of client terminals joining the multi-path.

An embodiment of the present disclosure enables to set up a multi-path suitable for a master node or a specific slave node based on information collected from at least one slave node within a small network in the master node.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), RAM, CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing congestion in a first node in a wireless communication system, the method comprising:
    receiving, by the first node, status information from each of nodes configuring a network with the first node;
    receiving, by the first node, information about a service requirement criterion from a second node as one of the nodes;
    acquiring, by the first node, setup information about an additional path for the second node based on the status information received from each of the nodes and the information about the service requirement criterion received from the second node; and
    transmitting, by the first node, the acquired setup information to the second node.

2. The method of claim 1,
wherein the status information of each of the nodes includes at least one of information about a wireless link characteristic, an end-to-end (E2E) path characteristic or computing resource information of each of the nodes,
wherein the information about the wireless link characteristic includes at least one of a reference signal received power (RSRP), a reference signal received quality (RSRQ), a signal to interference-plus-noise ratio (SINR), a modulation and coding scheme (MCS) level, a service coverage, or a bit error rate (BER), and
wherein the information about the E2E path characteristic includes at least one of a transmission control protocol (TCP) throughput, a round trip time (RTT), or a packet error rate.

3. The method of claim 1, wherein the information about the service requirement criterion is received from the second node before a service is initiated by the second node, and includes information about at least one of a minimum throughput required for the service, a maximum round trip time (RTT), a maximum error tolerance rate, or a minimum computing capability.

4. The method of claim 2, wherein the acquiring of the setup information further comprises:
 generating an E2E path information table based on the status information received from each of the nodes; and
 acquiring the setup information satisfying the information about the service requirement criterion received from the second node from the generated E2E path information table.

5. The method of claim 1, wherein the additional path setup information includes identification information designating at least one third node with which the second node will set up a direct path for generating an additional path as one of the nodes.

6. A first node in a wireless communication system, the first node comprising:
 a transceiver configured to:
  receive status information from each of nodes configuring a network with the first node,
  receive information about a service requirement criterion from a second node as one of the nodes, and
  transmit setup information about an additional path to the second node; and
 at least one processor configured to:
  acquire the setup information for the second node based on the status information of each of the nodes and the information about the service requirement criterion received through the transceiver, and
  transfer the acquired setup information to the transceiver.

7. The first node of claim 6,
wherein the status information of each of the nodes includes at least one of information about a wireless link characteristic, an end-to-end (E2E) path characteristic or computing resource information of each of the nodes,
wherein the information about the wireless link characteristic includes at least one of a reference signal received power (RSRP), a reference signal received quality (RSRQ), a signal to interference-plus-noise ratio (SINR), a modulation and coding scheme (MCS) level, a service coverage, or a bit error rate (BER), and
wherein the information about the E2E path characteristic includes at least one of a transmission control protocol (TCP) throughput, a round trip time (RTT), or a packet error rate.

8. The first node of claim 6, wherein the information about the service requirement criterion is received from the second node before a service is initiated by the second node, and includes information about at least one of a minimum throughput required for the service, a maximum round trip time (RTT), a maximum error tolerance rate, or a minimum computing capability.

9. The first node of claim 7, wherein the at least one processor is further configured to:
 generate an E2E path information table based on the status information received from each of the nodes, and
 acquire the setup information satisfying the information about the service requirement criterion received from the second node from the generated E2E path information table.

10. The first node of claim 6, wherein the additional path setup information includes identification information designating at least one third node with which the second node will set up a direct path for generating an additional path as one of the nodes.

* * * * *